United States Patent
Bagewadi

(10) Patent No.: US 7,216,203 B1
(45) Date of Patent: May 8, 2007

(54) READ AHEAD TECHNIQUE FOR NETWORK BASED FILE SYSTEMS

(75) Inventor: Sanjeev Bagewadi, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 363 days.

(21) Appl. No.: 10/669,804

(22) Filed: Sep. 23, 2003

(51) Int. Cl.
*G06F 12/00* (2006.01)

(52) U.S. Cl. ...................................... 711/137
(58) Field of Classification Search ................ 711/137
See application file for complete search history.

(56) References Cited

U.S. PATENT DOCUMENTS

| | | | | |
|---|---|---|---|---|
| 6,026,452 A * | 2/2000 | Pitts | ............................ | 710/56 |
| 6,272,590 B1 * | 8/2001 | Riedle | ......................... | 711/113 |
| 6,449,696 B2 * | 9/2002 | Okayasu | ..................... | 711/137 |
| 6,757,705 B1 * | 6/2004 | Pardikar et al. | ............ | 709/203 |
| 6,829,680 B1 * | 12/2004 | Sugumar et al. | ............ | 711/137 |
| 6,848,028 B1 * | 1/2005 | Sugumar et al. | ............ | 711/137 |
| 6,871,218 B2 * | 3/2005 | Desai et al. | ................. | 709/213 |
| 2003/0065889 A1 * | 4/2003 | Kamitani et al. | ........... | 711/137 |
| 2004/0205300 A1 * | 10/2004 | Bearden | ..................... | 711/137 |
| 2005/0021912 A1 * | 1/2005 | Ho et al. | .................... | 711/137 |

* cited by examiner

*Primary Examiner*—Matthew Kim
*Assistant Examiner*—Ryan A. Dare
(74) *Attorney, Agent, or Firm*—Martine Penilla & Gencarella, LLP

(57) ABSTRACT

One embodiment of the present invention includes a method for enabling a client node to automatically read ahead data from a network based file system. Specifically, in response to an application operating on the client node requesting a data page, the client node requests delivery of data pages from the network based file system. Upon reception, these data pages can each be served to the application. After each data page is served, it is determined whether the number of unrequested available data pages is less than the value of M. If so, an asynchronous read-ahead request is sent to a primary node of the network based file system for P number of data pages. The values of M and P can be such that P data pages can be fetched before M data pages are consumed by the requesting application.

15 Claims, 4 Drawing Sheets

READ AHEAD TECHNIQUE FOR NETWORK BASED FILE SYSTEMS

BACKGROUND

Computers have become integral tools used in a wide variety of different applications, such as in finance and commercial transactions, computer-aided design and manufacturing, health care, telecommunication, education, etc. Computers are finding new applications as a result of advances in hardware technology and rapid development in software technology. Furthermore, the functionality of a computer system is dramatically enhanced by coupling these types of stand-alone devices together in order to form a networking environment. Within a networking environment, computer users may readily exchange files, share information stored on a common database, pool resources, and communicate via electronic mail (e-mail) and video teleconferencing.

It is appreciated that computers can receive data and information stored on a common database known as a network based file system. For example, a back-up software application operating on a client computer may try to read a huge data file sequentially (from the first byte to the last byte) from a network based file system. Conventionally, as part of this reading process, the back-up application asks for a particular page of data. As such, the file system operating on the client computer determines whether that data page is available on the client computer. If so, the data page is returned to the back-up application. If not, the file system causes the client computer to transmit a read request for that particular page across a network to a primary node which is serving the network based file system. It is noted that the primary node is the client access point for the network based file system and the primary node is connected to the storage which physically holds the data of the file system. The primary node fetches the requested data page from the storage and then sends it to the client computer via the network. The file system operating on the client computer subsequently provides the requested data page to the back-up software application. It is understood that this process can be repeated for each requested data page.

One conventional technique for reducing network delay is that when the current data page asked for is not available on the client computer, the file system causes the client computer to send a synchronous read request for the current data page to the primary node. Additionally, the file system on the client computer also send an asynchronous read request for the next "X" pages of data that follow the current data page since the back-up application is going to eventually request them. Subsequently, the requested current data page and the next X pages of data are received by the client computer from the primary node and then stored. With the current data page and the next X pages of data resident on the client computer, the file system can promptly serve each of these data pages to the back-up application upon request. This process described above is repeated each time the current page is unavailable on the client computer.

SUMMARY

One embodiment of the present invention includes a method for enabling a client node to automatically read ahead data from a network based file system. Specifically, in response to an application operating on the client node requesting a data page, the client node requests delivery of data pages from the network based file system. Upon reception, these data pages can each be served to the application. After each data page is served, it is determined whether the number of unrequested available data pages is less than the value of M. If so, an asynchronous read-ahead request is sent to a primary node of the network based file system for P number of data pages. The values of M and P can be such that P data pages can be fetched before M data pages are consumed by the requesting application. As such, the application does not wait for data pages to be fetched from the network based file system.

In another embodiment, the present invention provides a method for reading ahead data pages from a network based file system. The method includes determining whether a number of available data pages resident to a client node satisfies a defined condition associated with a first value. Furthermore, the method includes initiating a read-ahead operation for a second value of data pages from the network based file system provided the number of available data pages satisfies the defined condition. It is noted that the second value of data pages can be fetched from the network based file system before an application operating on the client node consumes the first value of data pages.

In yet another embodiment, the present invention provides a computer readable medium having computer readable code embodied therein for causing a client computer to read ahead data pages from a network based file system. For example, the computer readable code may cause the client computer to ascertain whether a number of available data pages associated with the client computer satisfies a defined condition associated with a first value. Additionally, the computer readable code may cause the client computer to transmit a read-ahead request for a second value of data pages from the network based file system provided the number of available data pages satisfies the defined condition. It is noted that the second value of data pages can be fetched from the network based file system before an application operating on the client computer utilizes the first value of data pages.

In still another embodiment, the present invention provides a computer system. The computer system includes a processor and a data bus coupled to the processor. Additionally, the computer system includes a memory device coupled to communicate with the processor for performing operations. For example, the operations can include determining whether a number of available data pages resident to the computer system satisfies a defined condition associated with a first value. Also, the operations can include initiating a read-ahead operation for a second value of data pages from the network based file system provided the number of available data pages satisfies the defined condition. It is noted that the second value of data pages can be fetched from the network based file system before an application operating on the computer system consumes the first value of data pages.

While particular embodiments of the present invention have been specifically described within this summary, it is noted that the invention is not limited to these embodiments. The invention is intended to cover alternatives, modifications and equivalents which may be included within the scope of the invention as defined by the claims.

DESCRIPTION OF PREFERRED EMBODIMENTS

Figure 1:
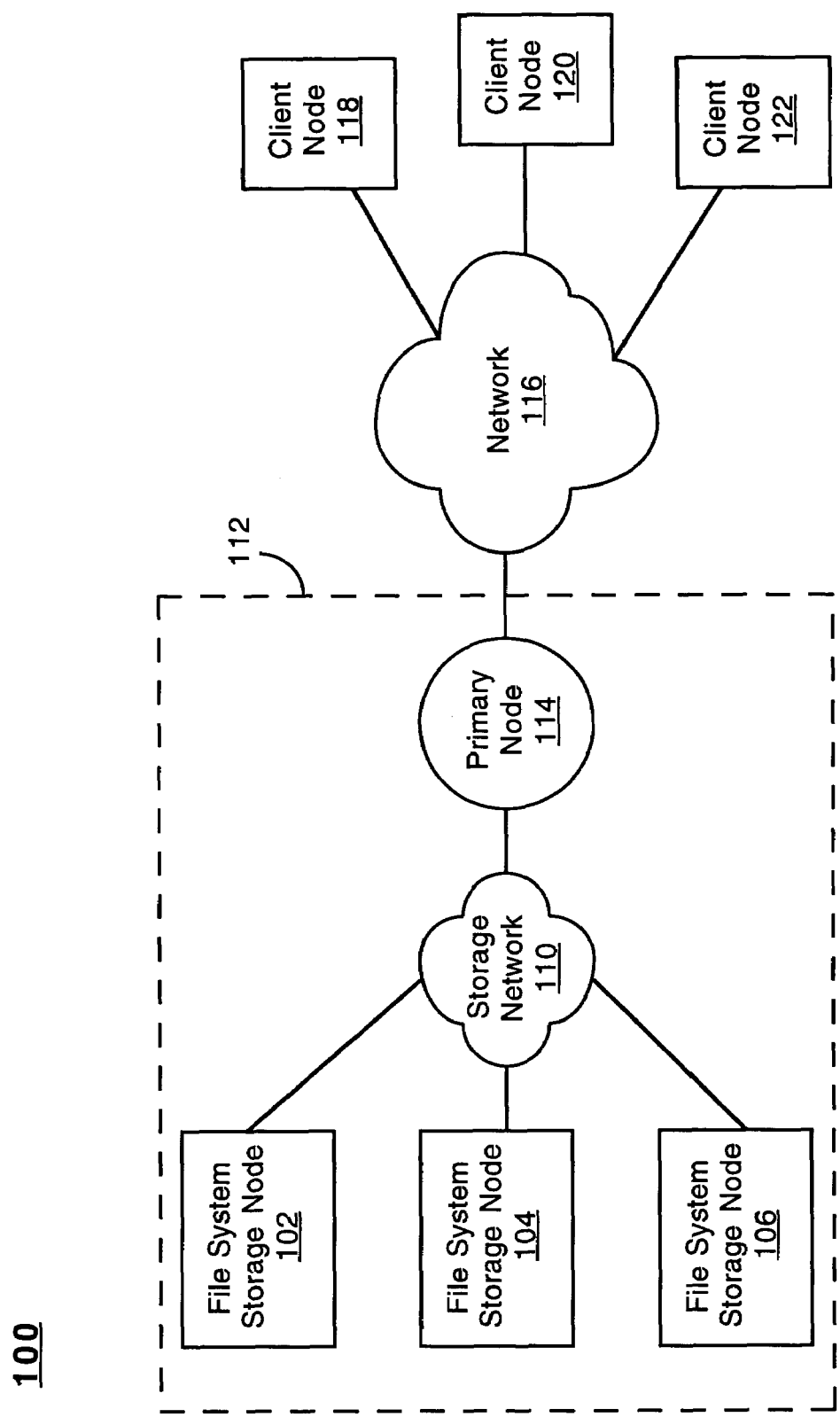
FIG. 1 is a block diagram of an exemplary system that can be utilized in accordance with embodiments of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computing system or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals may be referred to as bits, values, elements, symbols, characters, terms, numbers, or the like with reference to the present invention.

Bear in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "ascertaining", "determining", "initiating", "enabling", "controlling", "transmitting", "receiving", "generating", "utilizing", "storing" or the like, refer to the action and processes of a computing system, or similar electronic computing device, that manipulates and transforms data. The data is represented as physical (electronic) quantities within the computing system's registers and memories and can be transformed into other data similarly represented as physical quantities within the computing system's memories or registers or other such information storage, transmission, or display devices.

Exemplary System in Accordance with the Present Invention

FIG. 1 is a block diagram of an exemplary system 100 that can be utilized in accordance with embodiments of the present invention. For example, client nodes 118, 120 and 122 can each receive data from a network based file system 112 via a primary node 114 and a network 116. It is noted that this data may be requested and receive by each of client nodes 118, 120 and 122 in accordance with embodiments (e.g., flowchart 200 and/or flowchart 300) of the present invention described herein.

Within system 100, primary node 114 and client nodes 118, 120 and 122 can be communicatively coupled to network 116 enabling them to communicate. It is appreciated that primary node 114 and client nodes 118, 120 and 122 can each be communicatively coupled to network 116 via wired and/or wireless communication technologies. Additionally, primary node 114 can also be communicatively coupled to a storage network 110 of network based file system 112 which may be referred to as a cluster file system or a proxy file system. It is noted that primary node 114 can be the access point of network based file system 112 for client nodes 118, 120 and 122. File system storage nodes 102, 104 and 106 can also be communicatively coupled to storage network 110 thereby enabling them to communicate with primary node 114. The primary node 114 and file system storage nodes 102, 104 and 106 can each be coupled to storage network 110 via wired and/or wireless communication technologies.

The storage network 110 and network 116 of system 100 can each be implemented in a wide variety of ways in accordance with the present embodiment. For example, storage network 110 and network 116 can each be implemented as, but is not limited to, a local area network (LAN), a metropolitan area networks (MAN), a wide area network (WAN), and/or the Internet. Additionally, storage network 110 and network 116 can each be implemented with wired and/or wireless communication technologies.

Within FIG. 1, it is understood that system 100 can include greater or fewer client nodes than the three client nodes (e.g., 118, 120 and 122) shown. Furthermore, system 100 can include greater or fewer file system storage nodes than the three file system storage nodes (e.g., 102, 104 and 106) shown. It is noted that file system storage nodes 102–106, primary node 114, and client nodes 118–122 may each be implemented in a manner similar to a computer system 400 of FIG. 4 described herein. However, each of these components of system 100 is not limited to such an implementation.

Exemplary Operations in Accordance with the Present Invention

One embodiment in accordance with the present invention includes a method for enabling a client node to automatically read ahead data from a network based file system. Specifically, in response to an application operating on the client node requesting a data page, the client node requests delivery of data pages from the network based file system. Upon reception, these data pages can each be served to the application. After each data page is served, it is determined whether the number of available unrequested data pages is less than the value of M. If so, an asynchronous read-ahead request is sent to a primary node of the network based file system for P number of data pages. The values of M and P can be such that P data pages can be fetched before M data pages are consumed by the requesting application. In this manner, the application does not wait for data pages to be fetched from the network based file system.

Figure 2:
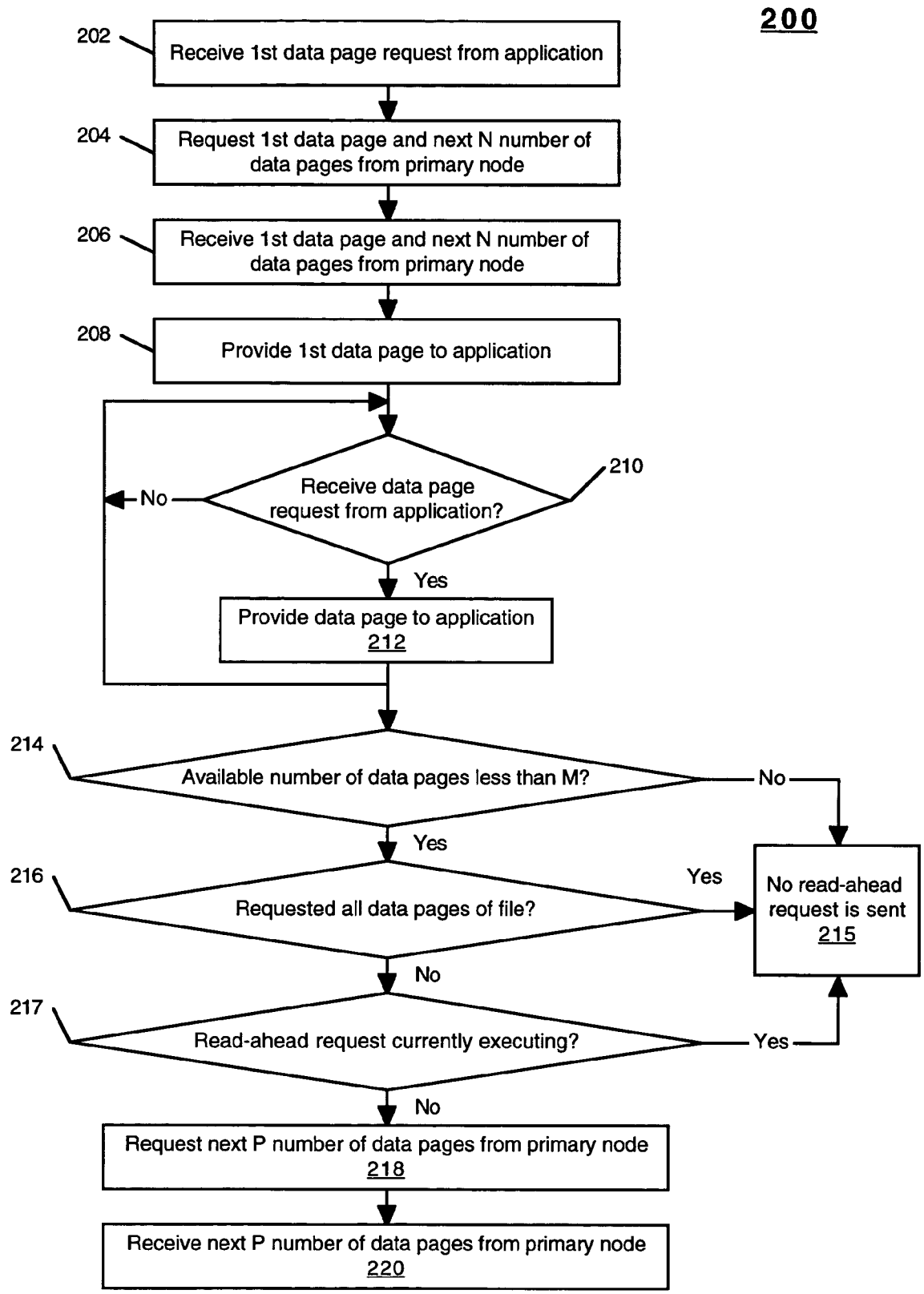
FIG. 2 is a flowchart of operations performed in accordance with an embodiment of the present invention for enabling a client node to read ahead data from a network based file system.

FIG. 2 is a flowchart 200 of operations performed in accordance with an embodiment of the present invention for enabling a client node (e.g., 120 of FIG. 1) to read ahead data from a network based file system (e.g., 112 of FIG. 1). Flowchart 200 includes exemplary processes of embodiments of the present invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and executable instructions may reside in any type of computer readable medium. Although specific operations are disclosed in flowchart 200, such operations are exemplary. That is, the present embodiment is well suited to performing various other operations or variations of the operations recited in FIG. 2. It is noted that the operations of flowchart 200 can be performed by software, by firmware, by hardware or by any combination thereof.

The present embodiment provides a method for enabling a client node to automatically read ahead data from a network based file system. Specifically, an application operating on the client node requests the first page of data. As such, a request for the first data page and a request for the next N number of data pages following the first data page are transmitted simultaneously to a primary node of a network based file system. Subsequently, the client node receives the first data page and the next N number of data pages from the primary node. As such, the first data page is provided to the requesting application. A determination is made as to whether a request for a data page has been received from the application operating on the client node. If not, process 200 returns to repeat this determination. However, if a request for a data page has been received, the data page stored by the client node is provided to the requesting application. After providing the data page, process 200 returns to repeat the determination of whether a request for a data page has been received.

Additionally, after each data page is served to the application, it is determined whether the available number of data pages resident to the client node yet to be requested by the application is less than a value of M. If not, no read-ahead request is sent. If so, it is determined whether all of the data pages associated with the particular data file have been requested from the network based file system. If all of the data pages have been requested, no read-ahead request is sent. However, if all of the data pages have not been requested, it is determined whether a read-ahead request is currently executing. If so, no read-ahead request is sent. However, if a read-ahead request is not currently executing, a read-ahead request for the next P number of data pages is transmitted to the primary node of the network based file system. Subsequently, the next P number of data pages are received from the primary node. It is noted that the values of M and P can be such that P number of pages are able to be fetch before M number of pages can be consumed (or utilized) by the requesting application. In this manner, the requesting application operating on the client node does not have to wait for data pages to be fetched from the network based file system thereby improving its read operation performance.

It is noted that flowchart 200 is described in conjunction with FIG. 1 in order to more fully describe the operations of the present embodiment. At operation 202 of FIG. 2, a request for the first page of data of a data file is received from an application operating on a client node (e.g., 118, 120 or 122). It is noted that the application may include, but is not limited to, an application for backing-up data, a database application, a data requesting application, and the like. Additionally, the requested page of data may include any amount of data, e.g., 6 kilobytes (Kbytes), 8 Kbytes, 10 Kbytes, etc.

At operation 204, a synchronous read request for the first page of data and an asynchronous read request for the next N number of data pages are sent simultaneously or sequentially by the client node (e.g., 120) to a primary node (e.g., 114) of a network based file system (e.g., 112) via a network (e.g., 116). It is noted that operation 204 may be implemented in a wide variety of ways in accordance with the present embodiment. For example, a file system in accordance with the present embodiment operating on the client node can cause the client node at operation 204 to transmit the data page read requests to the primary node of the network based file system. However, the present embodiment is not limited to such an implementation.

At operation 206 of FIG. 2, the client node (e.g., 120) subsequently receives from the primary node via the network the requested first data page and the next N number of pages of data. Upon reception, the received data pages may be stored by memory of the client node as part of operation 206. Within one embodiment of the invention, a file system operating on the client node causes the received data pages to be stored by the client node. However, the present embodiment is not limited to such an implementation. It is pointed out that previous to operation 206, the primary node may have fetched the first data page and the next N number of data pages from one or more file system storage nodes (e.g., 102, 104 and/or 106) of the network based file system (e.g., 112) in response to the received requests. Additionally, the primary node may have transmitted the fetched first data page and the next N number of data pages to the client node via the network.

At operation 208, the first page of data is provided to the requesting application operating on the client node. At operation 210, a determination is made as to whether another data page request has been received from the application operating on the client node. If another data page request has not been received from the application at operation 210, the present embodiment proceeds to the beginning of operation 210. However, if another data page request has been received from the application at operation 210, the present embodiment proceeds to operation 212.

At operation 212 of FIG. 2, the data page associated with the data page request is retrieved from memory of the client node and provided to the requesting application operating on the client node. It is noted that since the data page is provided to the application at operation 212, a value of one is subtracted from the total number of available data pages stored by client node for the application. Upon completion of operation 212, process 200 proceeds to operation 210. In this manner, process 200 is able to continue to provide (or serve) data pages to the application when requested as described above with reference to operations 210 and 212.

Additionally, upon completion of operation 212, process 200 also proceeds to operation 214.

At operation 214, a determination is made as to whether the total number of available data pages stored by client node for the operating application is less than a value of M. If the available number of data pages is not less than the value of M at operation 214, the present embodiment proceeds to operation 215. However, if the available number of data pages is less than the value of M at operation 214, the present embodiment proceeds to operation 216. It is noted that operation 214 may be implemented in diverse ways in accordance with the present embodiment. For example, at operation 214, a determination can be made as to whether the total number of available data pages stored by client node for the operating application is less than or equal to the value of M.

At operation 216, a determination is made as to whether all of the data pages associated with the particular data file have been requested from the primary node. If all of the data pages associated with the data file have not been requested from the primary node at operation 216, the present embodiment proceeds to operation 217. However, if all of the data pages associated with the data file have been requested at operation 216, the present embodiment proceeds to operation 215. At operation 215, no read-ahead request is sent by the client node.

At operation 217 of FIG. 2, a determination is made as to whether a read-ahead request to the network based file system is currently executing for the application. If a read-ahead request is currently executing at operation 217, the present embodiment proceeds to operation 215. However, if a read-ahead request is not currently executing at operation 217, the present embodiment proceeds to operation 218.

At operation 218, an asynchronous read-ahead request for the next P number of data pages is sent by the client node to the primary node of the network based file system via the network. It is noted that the values of M and P of process 200 can be such that the P number of data pages are able to be fetched from the network based file system before M number of pages are consumed (or utilized) by the requesting application operating on the client node. In this manner, the requesting application does not have to wait for data pages to be fetched from the network based file system thereby improving the performance of its data read operation. It is further noted that the values of M and P of process 200 can be determined by experimentation.

At operation 220 of FIG. 2, the client node subsequently receives from the primary node via the network the next P number of pages of data associated with the asynchronous read-ahead request. Upon reception, the received data pages may be stored by memory of the client node as part of operation 220. Within one embodiment in accordance with the invention, a file system operating on the client node causes the received P number of data pages to be stored by the client node. However, operation 220 is not limited to such an implementation. It is noted that the P number of data pages received is added to the total number of yet to be requested available data pages for the application.

One of the advantages provided by process 200 of FIG. 2 is that by the time the application operating on the client node consumes (or utilizes) the available M data pages, the previously requested P data pages have been fetched from the network based file system. Hence, there would be no need for the application to wait for data pages to be fetched from the network based file system. Additionally, this would avoid a substantial amount of the synchronous fetches (except in some cases of random read) and any wait for asynchronous reads to complete. As such, process 200 can provide a performance boost for sequential data reads from the network based file system.

Operations 202 and 208–220 of process 200 may each be implemented by a file system in accordance with the present embodiment operating on the client node (e.g., 120) along with operations 204 and 206 as described herein. However, the present embodiment is not limited in any way to such an implementation. It is appreciated that operations of flowchart 200 may be performed in an order different than that shown within FIG. 2. For example, operation 216 may be performed before operation 214. Alternatively, operation 217 may be performed before operations 214 and 216.

Within one embodiment in accordance with the invention, it is noted that process 200 can be exited (not shown) once all of the data pages have been provided to the requesting application operating on the client node (e.g., 120).

Figure 3:
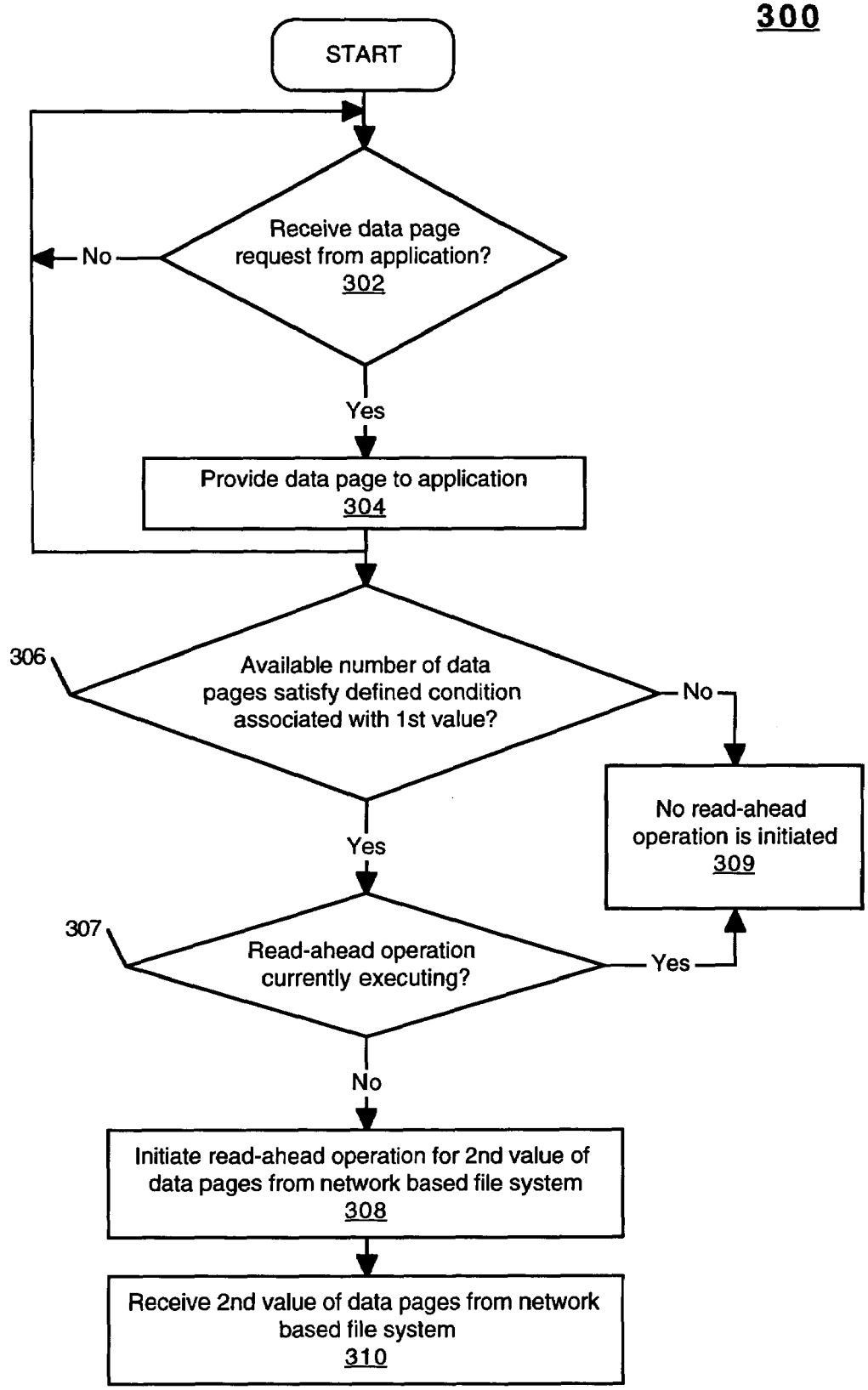
FIG. 3 is a flowchart of operations performed in accordance with another embodiment of the present invention for enabling a client node to read ahead data from a network based file system.

FIG. 3 is a flowchart 300 of operations performed in accordance with an embodiment of the present invention for enabling a client node (e.g., 120) to read ahead data from a network based file system (e.g., 112). Flowchart 300 includes exemplary processes of embodiments of the present invention which can be carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and executable instructions may reside in any type of computer readable medium. Although specific operations are disclosed in flowchart 300, such operations are exemplary. That is, the present embodiment is well suited to performing various other operations or variations of the operations recited in FIG. 3. It is noted that the operations of flowchart 300 can be performed by software, by firmware, by hardware or by any combination thereof.

The present embodiment provides a method for enabling one or more client nodes (e.g., 118, 120 and/or 122) to automatically read ahead data from a network based file system (e.g., 112) which may be referred to as a proxy file system. Specifically, it is determined whether a request for a data page has been received from an application operating on the client node. If not, process 300 returns to repeat this determination. However, if a request for a data page has been received, the data page resident to the client node is provided to the requesting application. After providing the data page, process 300 returns to repeat the determination of whether a request for a data page has been received.

Additionally, after each data page is served to the application, it is determined whether the number of unrequested available data pages resident to the client node satisfies a defined condition associated with a first value. If not, no additional read-ahead operation is executed. If so, a determination is made as to whether a read-ahead operation with a network based file system is currently executing. If a read-ahead operation is currently executing, no read-ahead operation is initiated. However, if a read-ahead operation is not currently executing, a read-ahead operation is initiated for a second value of data pages from the network based file system. Later, the second value of data pages is received from the network based file system. Within the present embodiment, the first and second values can be such that the second value of data pages can be fetched from the network based file system before the first value of data pages can be consumed (or utilized) by the requesting application. In this manner, the requesting application operating on the client node does not have to wait for data pages to be fetched from the network based file system thereby improving its read operation performance.

It is noted that flowchart 300 is described in conjunction with FIG. 1 in order to more fully describe the operations of the present embodiment. At operation 302 of FIG. 3, it is determined whether a data page request has been received from an application operating on the client node (e.g., 118, 120 or 122). If a data page request has not been received from the application at operation 302, the present embodiment proceeds to the beginning of operation 302. However, if a data page request has been received from the application at operation 302, the present embodiment proceeds to operation 304. It is noted that the application operating on the client node may include, but is not limited to, an application for backing-up data, a database application, a data requesting application, and the like. Furthermore, the requested data page may include any amount of data.

At operation 304, the data page associated with the data page request is retrieved from memory associated with the client node and provided (or served) to the requesting application operating on the client node. It is noted that since the data page is provided to the application at operation 304, the value of one is subtracted from the total number of available data pages stored by client node for the application. Upon completion of operation 304, process 300 proceeds to operation 302. In this manner, process 300 is able to continue to provide data pages to the application when requested as described above with reference to operations 302 and 304. Additionally, upon completion of operation 304, process 300 also proceeds to operation 306.

At operation 306 of FIG. 3, it is determined whether the total number of available unrequested data pages resident to (or associated with) the client node for the application satisfies a defined condition associated with a first value. If the available number of data pages does not satisfy the defined condition at operation 306, the present embodiment proceeds to operation 309. However, if the available number of data pages satisfies the defined condition associated with the first value at operation 306, the present embodiment proceeds to operation 307. It is understood that operation 306 can be implemented in diverse ways in accordance with the present embodiment. For example, the defined condition of operation 306 may be that the total number of available unrequested data pages resident to (or associated with) the client node for the application is less than the first value. Alternatively, the defined condition of operation 306 may be that the total number of available unrequested data pages is equal to the first value. In another embodiment, the defined condition of operation 306 may be that the total number of available unrequested data pages is less than or equal to the first value. However, the defined condition of operation 306 is not limited to these exemplary embodiments.

At operation 307, a determination is made as to whether a read-ahead operation with a network based file system is currently executing for the application. If a read-ahead operation is not currently executing at operation 307, the present embodiment proceeds to operation 308. However, if a read-ahead operation is currently executing at operation 307, the present embodiment proceeds to operation 309. At operation 309, no read-ahead operation is initiated.

At operation 308 of FIG. 3, a read-ahead operation (e.g., asynchronous read operation) can be initiated for a second value of data pages from the network based file system (e.g., 112) via a communication network (e.g., 116). It is understood that the first and second values of process 300 can be such that the second value (or number) of data pages can be fetched from the network based file system before the first value (or number) of data pages are consumed (or utilized) by the requesting application operating on the client node (e.g., 120). In this manner, the requesting application does not have to wait for data pages to be fetched from the network based file system thereby improving the performance of its data read operation. It is noted that the first and second values of process 300 can be determined by experimentation.

At operation 310, the client node receives via the network the second value of data pages associated with the read-ahead operation from the network based file system. Upon reception, the received data pages may be stored by memory associated with the client node as part of operation 310. It is noted that prior to operation 310, a primary node of the network based file system may have fetched the second value of data pages from one or more file system storage nodes (e.g., 102, 104 and/or 106) of the network based file system (e.g., 112) in response to the initiated read-ahead operation. Furthermore, the primary node may have transmitted the fetched second value of data pages to the client node via the network. Within one embodiment of the invention, a file system operating on the client node can cause the received second value of data pages to be stored by the client node. However, operation 310 is not limited to such an implementation. It is appreciated that the received second value of data pages is added to the total number of unrequested available data pages resident to the client node for the application.

Within one embodiment in accordance with the invention, it is noted that process 300 can be exited (not shown) once all of the data pages associated with one or more data files stored by the network based file system have been received by the client node and provided to the requesting application operating on the client node.

One of the advantages provided by process 300 of FIG. 3 is that by the time the previously requested second value of data pages have been fetched, the application operating on the client node has not yet consumed (or utilized) the available first value of data pages resident to the client node. Therefore, once the data pages have been delivered to the client node, the application does not have to wait for data pages to be fetched from the network based file system. As such, process 300 can provide a performance boost for sequential data reads from the network based file system.

It is noted that operations 302–308 of process 300 may each be implemented by a file system in accordance with the present embodiment operating on the client node (e.g., 120) along with operation 310 as described herein. However, the present embodiment is not limited in any way to such an implementation. It is appreciated that operations of flowchart 300 may be performed in an order different than that shown within FIG. 3. For example, operation 307 may be performed before operation 306.

Exemplary Hardware in Accordance with the Present Invention

Figure 4:
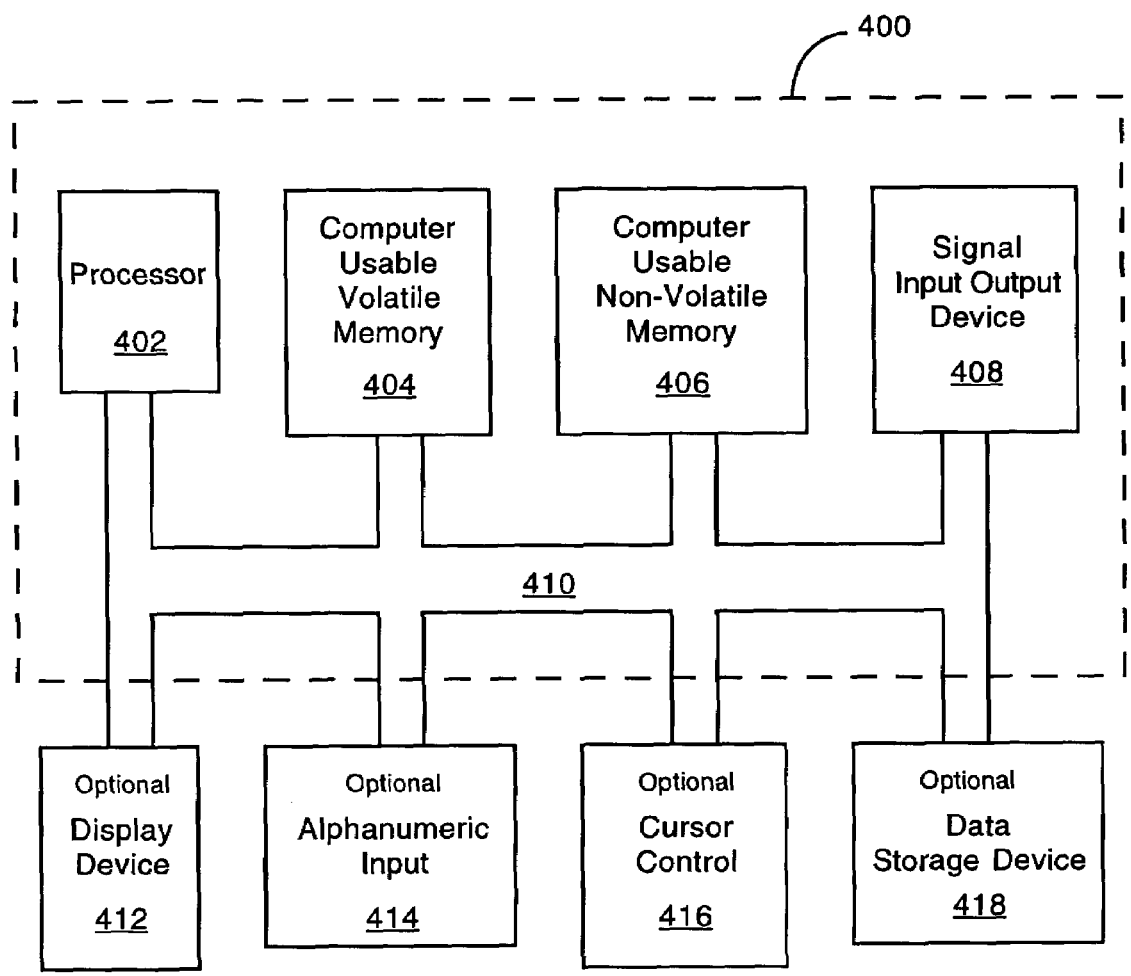
FIG. 4 is a block diagram of an exemplary computer system that can be used in accordance with embodiments of the present invention.

FIG. 4 is a block diagram of an exemplary computer system 400 that may be used in accordance with embodiments of the present invention. For example, client nodes 118–122, primary node 114, and file system storage nodes 102–106 of FIG. 1 may each be implemented in a manner similar to computer system 400. However, each is not limited to such an implementation. It is understood that system 400 is not strictly limited to be a computer system. As such, system 400 of the present embodiment is well suited to be any type of computing device (e.g., server computer, desktop computer, laptop computer, portable computing device, etc.). Within the discussions of embodiments in accordance with the present invention herein, certain processes and operations were discussed that may be realized, in some embodiments, as a series of instructions (e.g., software program) that reside within computer readable memory of computer system 400 and executed by a processor(s) of system 400. When executed, the instructions cause computer 400 to perform specific operations and exhibit specific behavior which are described herein.

Computer system 400 comprises an address/data bus 410 for communicating information, one or more central processors 402 coupled with bus 410 for processing information and instructions. Central processor unit(s) 402 may be a microprocessor or any other type of processor. The computer 400 also includes data storage features such as computer usable volatile memory 404, e.g., random access memory (RAM), static RAM (SRAM), dynamic RAM (DRAM), etc., coupled with bus 410 for storing information and instructions for central processor(s) 402, computer usable non-volatile memory 406, e.g., read only memory (ROM), programmable ROM, flash memory, erasable programmable read only memory (EPROM), electrically erasable programmable read only memory (EEPROM), etc., coupled with bus 410 for storing static information and instructions for processor(s) 402.

System 400 of FIG. 4 also includes one or more signal generating and receiving devices 408 coupled with bus 410 for enabling system 400 to interface with other electronic devices. The communication interface(s) 408 of the present embodiment may include wired and/or wireless communication technology. For example, in one embodiment of the present invention, the communication interface 408 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment, a cable or digital subscriber line (DSL) connection may be employed. In such a case the communication interface(s) 408 may include a cable modem or a DSL modem. Additionally, the communication interface(s) 408 may provide a communication interface to the Internet.

Optionally, computer system 400 can include an alphanumeric input device 414 including alphanumeric and function keys coupled to the bus 410 for communicating information and command selections to the central processor(s) 402. The computer 400 can also include an optional cursor control or cursor directing device 416 coupled to the bus 410 for communicating user input information and command selections to the processor(s) 402. The cursor directing device 416 can be implemented using a number of well known devices such as a mouse, a track ball, a track pad, an optical tracking device, a touch screen, etc. Alternatively, it is appreciated that a cursor can be directed and/or activated via input from the alphanumeric input device 414 using special keys and key sequence commands. The present embodiment is also well suited to directing a cursor by other means such as, for example, voice commands.

The system 400 of FIG. 4 can also include a computer usable mass data storage device 418 such as a magnetic or optical disk and disk drive (e.g., hard drive or floppy diskette) coupled with bus 410 for storing information and instructions. An optional display device 412 is coupled to bus 410 of system 400 for displaying video and/or graphics. It should be appreciated that optional display device 412 may be a cathode ray tube (CRT), flat panel liquid crystal display (LCD), field emission display (FED), plasma display or any other display device suitable for displaying video and/or graphic images and alphanumeric characters recognizable to a user.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for reading ahead data pages from a network based file system, said method comprising:
   determining whether a number of available data pages resident to a client node satisfies a defined condition associated with a first value;
   initiating a read-ahead operation for a second value of data pages from said network based file system provided said number of available data pages satisfies said defined condition;
   receiving said second value of data pages from said network based file system for providing to said an application operating on the client node; and
   adding said second value of data pages to said number of available data pages resident to said client node,
   wherein said second value of data pages can be fetched from said network based file system before the application operating on said client node consumes said first value of data pages and wherein said read-ahead operation for the second value of data pages is initiated upon serving a data page of the number of available data pages to the application operating on the client node.

2. The method as described in claim 1, wherein said defined condition is that said number of available data pages resident to said client node is less than said first value.

3. The method as described in claim 1, wherein said defined condition is that said number of available data pages resident to said client node is equal to said first value.

4. The method as described in claim 1, wherein said defined condition is that said number of available data pages resident to said client node is less than or equal to said first value.

5. The method as described in claim 1, further comprising:
   providing a data page to said application operating on said client node in response to receiving a data page request from said application; and
   subtracting a value of one from said number of available data pages resident to said client node.

6. A computer readable medium embodied in hardware storage having computer readable code embodied therein for causing a client computer to read ahead data pages from a network based file system, comprising:
   ascertaining whether a number of available data pages associated with said client computer satisfies a defined condition associated with a first value;

transmitting a read-ahead request for a second value of data pages from said network based file system provided said number of available data pages satisfies said defined condition receiving said second value of data pages from said network based file system for providing to an application operating on the client; and adding said second value of data pages to said number of available data pages associated with said client computer, wherein said second value of data pages can be fetched from said network based file system before the application operating on said client computer utilizes said first value of data pages and wherein said read-ahead request for the second value of data pages is transmitted upon serving a data page of the number of available data pages to the application operating on the client node.

7. The computer readable medium as described in claim 6, wherein said defined condition is that said number of available data pages associated with said client computer is less than said first value.

8. The computer readable medium as described in claim 6, wherein said defined condition is that said number of available data pages associated with said client computer is equal to said first value.

9. The computer readable medium as described in claim 6, wherein said defined condition is that said number of available data pages associated with said client computer is less than or equal to said first value.

10. The computer readable medium as described in claim 6, further comprising:

serving a data page to said application operating on said client computer in response to receiving a data page request from said application; and subtracting a value of one from said number of available data pages associated with said client computer.

11. A computer system comprising:

a processor;

a data bus coupled to said processor; and a memory device coupled to communicate with said processor for performing:

determining whether a number of available data pages resident to said computer system satisfies a defined condition associated with a first value;

initiating a read-ahead operation for a second value of data pages from said network based file system provided said number of available data pages satisfies said defined condition;

receiving said second value of data pages from said network based file system for providing to an application operating on the computer system; and adding said second value of data pages to said number of available data pages resident to said computer system, wherein said second value of data pages can be fetched from said network based file system before the application operating on said computer system consumes said first value of data pages and wherein said read-ahead operation for the data pages is initiated upon serving a data page of the number of available data pages to the application operating on the client node.

12. The computer system as described in claim 11, wherein said defined condition is that said number of available data pages resident to said computer system is less than said first value.

13. The computer system as described in claim 11, wherein said defined condition is that said number of available data pages resident to said computer system is equal to said first value.

14. The computer system as described in claim 11, wherein said defined condition is that said number of available data pages resident to said computer system is less than or equal to said first value.

15. The computer system as described in claim 11, further comprising:

serving a data page to said application operating on said computer system in response to receiving a data page request from said application; and subtracting a value of one from said number of available data pages resident to said computer system.

* * * * *